United States Patent Office 3,419,948
Patented Jan. 7, 1969

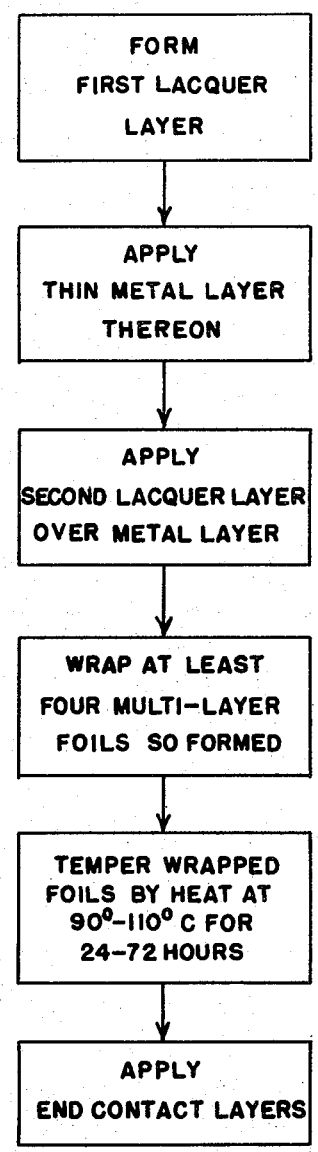

3,419,948
METHOD OF MAKING CAPACITORS HAVING IMPROVED CAPACITOR CONSTANCY
Walter Volkl, Grunwald, Germany, assignor to Siemens Aktiengesellschaft, Munich, Germany, a corporation of Germany
Continuation of Application 241,027, Nov. 29, 1962, now Patent No. 3,123,895. This application May 5, 1966, Ser. No. 548,357
Claims priority, application Germany, Dec. 8, 1961, S 77,042
U.S. Cl. 29—25.42       4 Claims
Int. Cl. H01g 13/04; H01g 1/01

This application is a continuation of application Ser. No. 241,027, now abandoned.

The invention disclosed herein is concerned with a method of improving the capacitance constancy of wrapped electrical thin-foil capacitors having metal coatings which are embedded between varnish layers and which are contacted at the end faces of the capacitor.

The copending application Ser. No. 104,268, filed Apr. 20, 1961, now Patent No. 3,123,895 which is owned by the assignee named in the present case, proposes a method of making a regenerative capacitor with high space capacitance, comprising placing a first varnish layer upon a carrier foil, providing on such first varnish layer a thin regenerative metal coating, preferably an aluminum coating, except for a marginal strip which is left vacant, placing upon said coating a second varnish layer corresponding in width to the width of said first varnish layer, removing from the carrier foil the resulting three-layer foil formed by the two varnish layers and the metal coating, and producing a capacitor from at least four such three-layer foils which are disposed in superposed relationship so that identical varnish layers are in mutual engagement, and connecting with one another and with outer current terminals, the metal coatings which are respectively aligned with vacant marginal strips, by spraying contact layers on the end faces of the assembly, so that the respective first varnish layers are disposed in the space which is free of the field while the second varnish layers are dielectrically effective. A capacitor with excellent properties, especially with a high efficiency factor, may be obtained in this manner, particularly upon making the dielectrically effective varnish layer of a dielectrically high grade substance such as polystyrol. Moreover, such a capacitor, in which the varnish layers which are disposed in the field-free space, are made of a substance with good regenerative properties, for example, acetylcellulose, ethylenecellulose or the like, has excellent regenerative properties. However, the capacitance constancy of capacitors made in this way is relatively poor.

It is known to produce electrical capacitors with the aid of prestressed bands of synthetic material and to subject the wraps formed, to a heat treatment which improves the constancy of the capacitance. However, the efficacy of this measure is based upon the prestressing of the bands of synthetic material incident to the production thereof, that is, upon placing these bands in a condition of tension or stress which is cancelled incident to the heat treatment, thereby effecting a solidification of the wrapped bodies. A prestressing of the dielectric layer, for example, polystyrol layer of a thin foil capacitor, such as is described in the previously noted copending application, is impossible in view of the manner in which such dielectric layers are produced. Accordingly, it could not be expected that a heat treatment applied to a corresponding wrapped body would effect any relaxation of the dielectric with solidification of such body and improvement of the capacitance constancy thereof.

It has now been surprisingly found that the capacitance constancy of thin foil wrapped capacitors made in accordance with the method described in the copending application, can be considerably improved by tempering such wrapped capacitors prior to providing the contact layers at the end faces thereof. For example, the tempering of the wraps of such thin foil capacitors, wherein the metallic coatings were embedded between acetylcellulose and polystyrol layers, prior to providing thereon the end face contact layers, resulted in a life test at 25° C. and 70° C. in a reduction of the capacitance variation approximately by the factor 5.

The temperature to be applied during the tempering treatment depends upon the materials which are being used for producing the thin foils. A temperature between 90° C. and 100° C. was found satisfactory in the case of capacitors in which the layer lying in the field-free space consists of acetylcellulose and in which the effective dielectric layer is made of polystyrol. The tempering treatment is appropriately applied for about 24 to 72 hours.

Thus, as illustrated in the drawing, which represents a flow diagram of the respective steps involved in the practice of the invention, the first lacquer layer would be formed, upon which is applied the thin metal layer, to be followed by a second lacquer layer. At least four such multi-layer coils so formed are then wrapped into a capacitor body which is tempered by heat at approximately 90°–110° C. for approximately twenty-four–seventy-two hours. The structure is then completed by the application of the end contact layers.

While the use of the tempering treatment has been found particularly effective in connection with capacitors produced in accordance with the above described method, it may likewise be successively applied in connection with other thin foil capacitors in which the metal coatings are on both sides embedded in varnish layers, and especially in connection with capacitors in which at least a part of the varnish layers is made of polystyrol.

Changes may be made within the scope and spirit of the appended claims which define what is believed to be new and desired to have protected by Letters Patent.

I claim:
1. A method of producing wrapped electrical thin-foil capacitors with improved capacity constancy, comprising the steps of forming a three-layer foil by forming a first lacquer-layer, applying a thin metal layer thereon, and applying a second lacquer layer of polystyrene over the metal layer, wrapping at least four such foils with the first lacquer layers lying in the field-free space in the finished capacitor, and the second lacquer layers being dielectrically effective, tempering the wrapped capacitor layers by heating the same at a temperature between 90 and 110° C. for a period of approximately 24 to 72 hours, and thereafter applying contact layers to the ends of the wrapped capacitor layers for the contacting of said metal layers.

2. A method according to claim 1, wherein said tempering is accomplished at a temperature of 100° C. for a period of twenty-four hours.

3. A method for improving the capacity constancy of electrical wrapped thin-foil capacitors, comprising the steps of forming a wrapped thin-foil capacitor structure in which metal coatings are embedded between varnish layers which consist at least in part of polystyrene, and tempering the capacitor structure by heating the same at a temperature between 90 and 110° C. for a period of approximately 24 to 72 hours.

4. A method according to claim 3, wherein said tempering is accomplished at a temperature of 100° C. for a period of twenty-four hours.

(References on following page)

References Cited

UNITED STATES PATENTS

| | | | |
|---|---|---|---|
| 2,211,583 | 8/1940 | Ruben | 117—227 |
| 2,295,759 | 9/1942 | Scheer | 117—227 |
| 2,387,759 | 10/1945 | Jarvis | 117—62 |
| 2,735,970 | 2/1956 | Peck et al. | 317—258 |
| 2,740,732 | 4/1956 | Peck et al. | 117—227 |
| 3,030,237 | 4/1962 | Price | 117—227 |
| 3,123,895 | 3/1964 | Henninger et al. | 29—25.42 |
| 3,144,371 | 8/1964 | Landolt | 117—62 |

MURRAY KATZ, *Primary Examiner.*

U.S. Cl. X.R.

317—258; 117—227, 62